United States Patent [19]
Kolbe

[11] 3,826,514
[45] July 30, 1974

[54] VEHICLE BANKING ARM CONSTRUCTION

[76] Inventor: Joachim Kolbe, 5126 Haskell Ave., Encino, Calif. 91316

[22] Filed: May 9, 1972

[21] Appl. No.: 251,831

[52] U.S. Cl............................ 280/96.2, 280/112 A
[51] Int. Cl............................................. B62d 9/02
[58] Field of Search........ 280/112 A, 124 B, 96.2 R

[56] References Cited
UNITED STATES PATENTS

| 3,181,883 | 4/1965 | Kolbe | 280/124 B |
| 3,202,441 | 8/1965 | Tea | 280/124 B |

Primary Examiner—Robert B. Reeves
Assistant Examiner—Hadd S. Lane
Attorney, Agent, or Firm—Andrus, Sceales, Starke & Sawall

[57] ABSTRACT

In a vehicle banking arm suspension each banking arm employs a flexible torsion spring member with means to stiffen it against flexing in the generally vertical direction. The spring specifically disclosed is a single leaf of generally uniform width and thickness disposed substantially horizontal and reinforced against vertical bending by one or more cables extending from end to end thereof and secured to the ends with an adjustable spacer arching the cable away from the leaf intermediate the ends to provide a truss.

6 Claims, 3 Drawing Figures

VEHICLE BANKING ARM CONSTRUCTION

BACKGROUND OF THE INVENTION

1. Field of the Invention

This invention pertains to the suspension structure for automotive vehicles and the like, and in particular to an improved vehicle banking arm construction for resiliently supporting the superstructure of curvebank cars to secure inward leaning of the superstructure during curve ride of the vehicle. The subject matter of this invention constitutes a further addition to a number of contributing working factors previously disclosed by this inventor, and which, in combination results in a banking arm superstructure resilient support which by replacing previously employed heavy, space requiring suspension means with much lighter and smaller structure, secures additional rotational banking freedom and, due to substantial weight reductions, an improved vehicle ride.

2. Description of the Prior Art

The development of a practical inexpensive vehicle suspension linkage system causing the superstructure to lean inwardly during curve ride has been the subject matter of many U.S. and foreign patents issued to this inventor. These include the following: U.S. Pat. No. 2,072,521 3/2/37 U.S. Pat. No. 2,076,786 4/13/37 U.S. Pat. No. 2,116,027 5/3/38 U.S. Pat. No. 2,234,676 3/11/41 U.S. Pat. No. 2,262,289 11/11/44 U.S. Pat. No. 2,576,686 11/27/51 U.S. Pat. No. 2,739,823 3/27/56 U.S. Pat. No. 2,820,646 1/21/58 U.S. Pat. No. 3,181,883 5/4/65 U.S. Pat. No. 3,556,553 1/19/71.

While the most important feature of a curvebank car is the inwardly inclined position of its superstructure during curve ride, the maintaining of a support base for the superstructure, exceptionally resilient during straight ahead ride but firm during curve ride, resulting in even greater proper inclination, remains most desirable.

The progression of the banking car suspension development disclosed in the patents enumerated above can be cited as one of change from higher to lower structures so as to eliminate the need to cut into the present vehicle passenger floor and to keep the center of mass of the vehicle as a whole as low as possible, as well as to reduce the weight of the newly introduced, banking securing structure. This invention constitutes further progress toward achieving these needs.

SUMMARY OF THE INVENTION

In carrying out the present invention the torsion spring is constructed to be rigid and substantially non-yielding against flexing in a generally vertical plane, and additionally reasonably resistant to flexing in a generally horizontal plane. It has been found that a single leaf spring is particularly adapted to provide the desired stiffness in the horizontal plane and a twist therein allows a limited yielding as described hereinafter, while means are provided to substantially control the flexing in the vertical plane.

More particularly, a single leaf spring is found to be sufficient to function as a torsionally operated spring and to simultaneously resist bending deflection in a horizontal plane in response to pressures exerted on the leaf, by the multiturn cushions, compressed under the vehicle load, while such pressures tending to deflect the leaf in bending in the vertical plane are redirected into preferably a steel cable arranged to create in cooperation with the leaf a truss structure, providing a firm center support for the leaf which keeps it operable for the desired torsional wind-up. Since in the earlier disclosures by this inventor related to the subject matter, up to 9 single leaves were needed arranged in a bundle inserted at its ends into special enclosure anchors to secure free torsional wind-up while resisting bending deformation in both planes, the saving in material and required space along constitutes substantial progress toward final acceptance for mass produced inexpensive effective curvebank suspensions.

The invention takes advantage of the discovery that by assigning to the resilient leaf means only two functions, torsional wind-up and delivery of resistance to bending deflection in the horizontal plane, while providing as a secondary means a steel cable connected and functioning to resist bending deformation of the leaf in a vertical plane, many advantages are secured besides weight reduction and increase of space now available for added banking motion as described hereinafter.

BRIEF DESCRIPTION OF THE DRAWING

The accompanying drawings illustrate the best mode presently contemplated of carrying out the invention.

In the drawings.

DESCRIPTION OF THE PREFERRED EMBODIMENT

Figure 1:
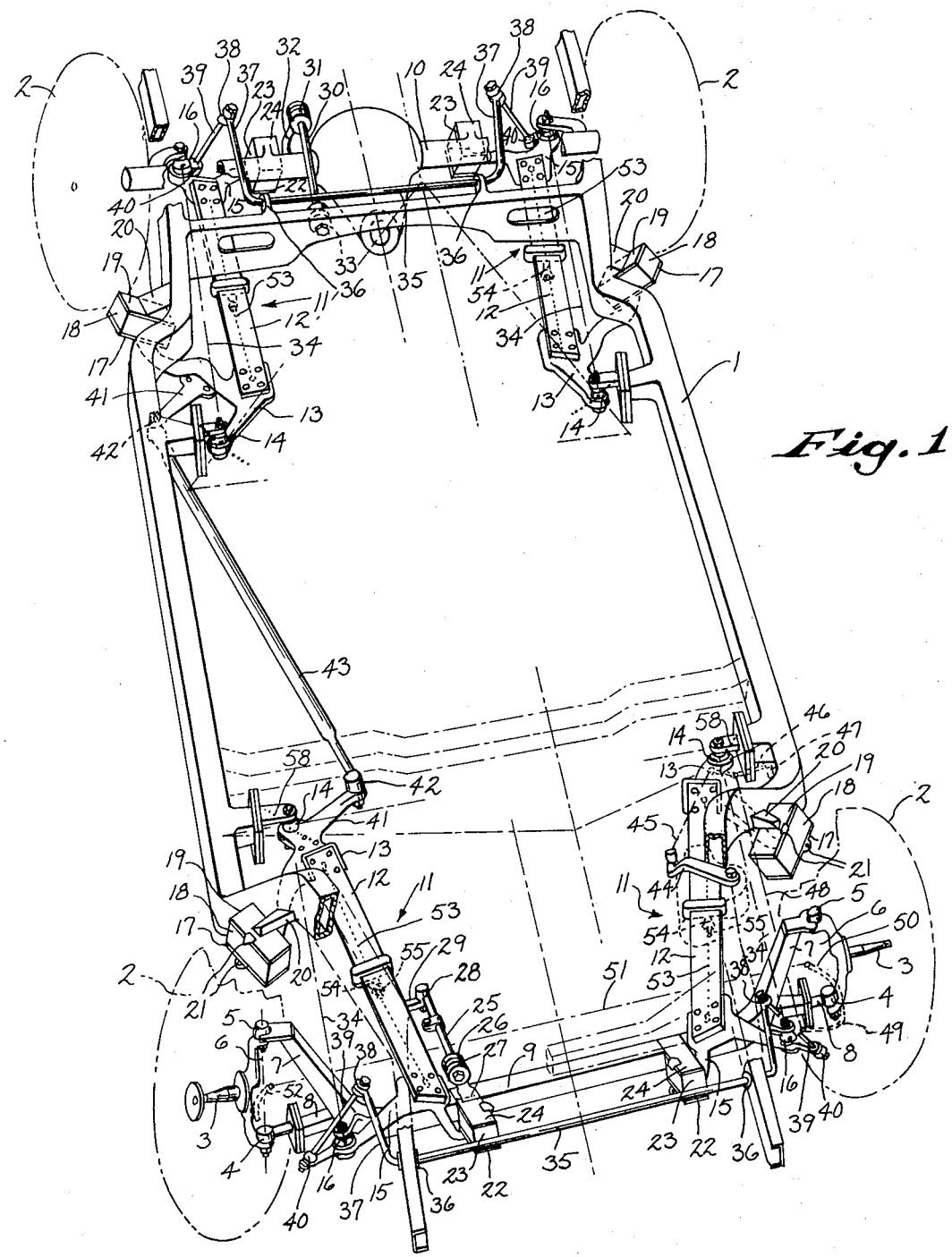
FIG. 1 is a perspective view of a vehicle chassis embodying the invention and showing the superstructure in a normal upright position.

FIG. 1 illustrates a vehicle body or superstructure having a chassis or body support frame 1 supported by wheels 2 on the road. The wheels 2 are arranged in pairs, one pair at the front end and the other pair at the rear end of the vehicle. The wheels of each pair are disposed on opposite sides of the superstructure and are equally spaced from the longitudinal vertical center plane of the vehicle.

The front wheels 2 each are supported by a wheel spindle member 3 connected by a lower balljoint 4 and an upper balljoint 5 placed along the kingpin line 6 to the forked ends 7 and 8 of the rigid front axle 9.

The rear wheels 2 are carrying a rigid rear axle housing 10. The front axle 9 and the rear axle housing 10 each are supporting the respective ends of a related pair of banking arms 11, which are supported at their other ends by the frame 1. Each banking arm 11 comprises a torsionally operated spring 12 preferably in the form of a single leaf connected at one end by a support bracket 13 for the support of the ball and socket joint 14 which connects said end of the banking arm 11 to the frame 1. The other end of the respective spring 12 is held by the support bracket 15 for the support of the ball and socket joint 16 which connects said end of the backing arm 11 to the rigid axle 9 in the front and to the rigid axle housing 10 in the rear of the vehicle.

Each support bracket 13 extends substantially horizontally and outwardly in a direction toward the nearest wheel 2 at a length of about ⅓ to ½ of the length of the related spring 12 in accordance with the geometry pattern selected for the operation of the device. The support bracket 13 carries a rectangular support plate 17 positioned inclined at an angle of approximately 45° relative to the road and to the longitudinal vertical center plane of the vehicle with its lower edge being closer to said center plane that its upper edge and with both edges arranged substantially parallel to the road. Each plate 17 supports a multiturn cushion 18 fabricated as a substantially rectangular block of polyurethane based material and which rests against an upper carrying plate 19 which is connected by the bracket 20 to the frame 1. A pair of tool supports 21 are provided for insertion of the related multiturn cushions by means of hydraulic porto-power tools. Each support bracket 15 extends substantially sidewardly and carries a rectangular support plate 22 positioned inclined at an angle of about 32° relative to the road and substantially parallel to the direction of the longitudinal vertical center plane of the vehicle and with its lower edge located closer to the respective rigid axle than its higher edge. Each plate 22 supports the multiturn cushion 23 shaped similar to cushion 18 and resting against the carrier plate 24 carried in effect by the respective rigid axle or axle housing located nearest to it.

The rigid front axle 9 is additionally connected to the frame 1 by the torque arm 25 spaced vertically from the leaf spring 12 with its front end supported by the resilient bushing 26 to the vertically extending bracket 27 carried by the axle 9, and its rear end supported by the ball and socket joint 28 to the horizontally extending bracket 29 to the frame 1.

The rigid axle housing 10 is additionally connected to the frame 1 by the torque arm 30 spaced vertically from the leaf spring 12 with its rearward end supported by the resilient bushing 31 to the vertically extending bracket 32 carried by the axle housing 10 and at its forward end supported by the resilient bushing 33 to the frame 1.

A straight line 34, representing each banking arm 11 is drawn between the centers of the correspoding ball joints 14 and 16.

Each frame end supports a sway bar 35 and bushings 36 with the longitudinally extending sway bar arms 37 connected by the resilient bushing 38 at their upper ends to the sway bar shackles 39 which are connected by the resilient bushings 40 to the respective support brackets 15 here connected by the ball and socket joints 16 to the axles closest to them.

Each support bracket 13 located on one side of the vehicle also carries an arm 41 sidewardly extending in a direction opposite to each other in relation to the two end sections of the vehicle, whereby each of said arms carries a ball and socket joint 42 on its free end, supporting the ends of a front-to-rear tie rod 43 arranged to secure lateral operation in unison of the front and rear pair of banking arms 11 during the roll turn of the superstructure into a banked position.

FIG. 1 further illustrates, schematically only, the front wheel steering linkage which is not considered a part of this invention but is planned to be presented in its inventive aspects in a separate application for patent. The linkage comprises the lever 44, which might be considered the Pitman arm of a steering gear mechanism enclosed by a gear housing mounted to the frame 1 to locate the arm as illustrated.

The lever 44 is pivotally connected at its outer end to a tie-rod 45 supported by the lever arm 46 which is pivotally supported by the pivot 47 to the frame 1. The lever arm 46 carries also the backward end of the steering drag link 48 whose forward end is connected to the spindle arm 49. The spindle member 3 also carries the steering arm 50. A steering cross tie-rod 51 extends between the steering arm 50 and a corresponding steering arm 52 located at the other side of the vehicle.

All tie-rod and drag link ends are connected to their respective support arms by ball and socket joints.

Each torsionally operated spring leaf 12 of the banking arm suspension illustrated in FIG. 1 tends to bend downwardly with its center section, due to the pressure exerted by each related multiturn cushion 18, which also winds each leaf up in torsion from its frame supported end, whenever the front axle 9 moves upwardly, parallel to itself, since the cushions 18 are positioned between the respective ball joints 14 and 16, and are spaced farther apart than the connecting lines 34 extending between the ball joints 14 and 16.

The torsional wind-up of each spring leaf will be greatly interfered with where the spring leaf 12 is permitted to take the downwardly bent shaped position.

For this reason, a new structural element has been added to each banking arm in form of a truss cable 53 positioned below the leaf and extending from one end of the spring leaf 12 or its related support bracket 15 to its other end or to the related support bracket 13. Between the center section of the spring leaf 12 and the truss cable 53 a truss column 54, preferably of adjustable height, is placed in order to form a structural triangle created by the leaf 12 and the two half-sections of the truss cable 53. The pressure exerted by the multiturn cushion 18 will now create compression along the length of the spring leaf 12 and tension in the two half sections of the truss cable with the truss column 54 resisting downward movement of the center section of the leaf spring 12.

Where, without the truss arrangement an approximately 4 inch downward bending deformation of the leaf would take place, with introduction of the truss cable arrangement, the center section of the leaf cannot move downwardly at all and each half section of the leaf would bend downwardly ⅛ inch only on the frame supported end and upwardly on the axle supported end, giving the leaf a slight S shape as appearing in side elevation. Although this deformation when related to a leaf thickness of ¼ inch will not be detrimental to the desired torsional wind-up of the leaf, it can be further resisted by creating a fixed shoulder 55 on the truss cable 53, as shown in FIG. 2, resisting the contact point between shoulder 55 and the lower end of the truss column 54 to move out of its longitudinal position, since this would force the frame supported section of the truss cable to elongate.

Figure 2:
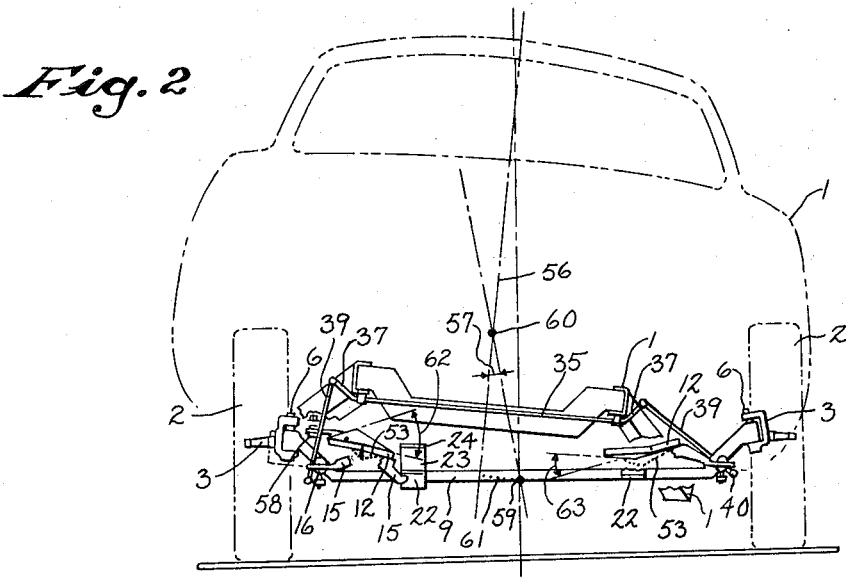
FIG. 2 is a schematic front elevation of the front end of the vehicle having its superstructure mounted as shown in FIG. 1 and turned into a roll-banked position.

FIG. 2 outlines the vehicle shown in FIG. 1 in front elevation with its superstructre 1 moved into a curvebank position as when under the influence of centrifugal force. The wheels 2 support the wheel spindle members 3, which here are connected directly by the kingpins 6 to the ends of the rigid axle 9. The wheels 2 stay erect during the rotational curvebank motion of the superstructure. The forward ends of the front torsionally operated leaf springs 12 are supported through the support brackets 15 by the ball joints 16 carried by the rigid front axle 9, and are also supported through the support brackets 15 extending sidewardly to support the rectangular support plates 22. Each plate 22 supports a multiturn cushion 23 resting against the carrier plate 24 carried by the axle 9.

The front sway bar 35 is hingedly connected to the frame 1 and is with its outer arms 37 pivotally attached to the sway bar shackles 39 which are pivotally connected by extensions of the support brackets 15 to the axle 9.

Due to the rotational banking motion of the superstructure and its frame 1 marked by the center line 56 and the angle 57, the backward ends of the front torsionally operated leaf springs 12, carried by the frame 1, as illustrated in FIG. 1 shift along the dotted outline marked 58. Since the front end of the superstructure is supported by the rigid front axle 9, the center of the rotational movement due to the displacement of the mass center 60 is located in height of the rigid axle as indicated by point 59. The mass center 60 has shifted laterally relative to the primary roll center 59. Numeral 61 indicates the distance the superstructure center line 56 shifts along the axle from the center of the axle.

Due to the trapezoid arrangement of the shackles as appearing in front elevation the roll motion of the superstructure will be an accelerated motion of sufficient angularity to secure a true inward inclination of the superstructure in spite of the normal yield of the curve outside located spring leaf and of the load reduction of the curve inside located spring leaf 12.

FIG. 2 also indicates the rotational wind-up of the spring leaves 12 and the position the truss cables 53 and the related truss columns 54 take during the rotational curve inward lean during the banking process. The strengthening of the curve outside support for the vehicle and its resilient relief on the curve inside is substantially increased by the shear deformation of the multi-turn cushions 17 and 23, as disclosed and described in detail in the U.S. Pat. No. 3,181,883 issued to this inventor, as referred to above. The relative larger rotational deflection of the spring leaf 12 positioned on the curve outside indicated by arc 62 than that of the leaf 12 positioned on the curve inside indicated by arc 63 indicates the spring loadings during curve ride as not interfering with the desired superstructure curve banking.

Figure 3:
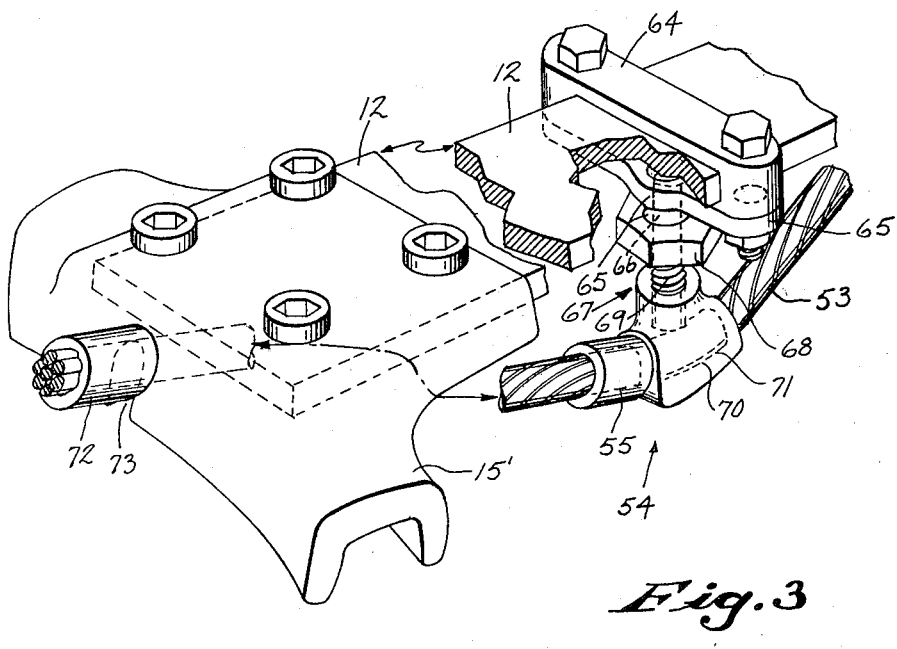
FIG. 3 is a detailed perspective view of the truss center column positioned between the banking arm leaf and the truss cable and including the connecting structure between leaf spring end and truss cable end.

FIG. 3 is a detailed perspective, partly sectional view of the truss column 54 in its attachment to the leaf spring 12, illustrating also the truss cable 53 and its anchoring, here shown as connected to the support bracket 15' which is placed above the leaf end to secure maximum inclination of the truss cable relative to the selected height of the truss column 54. A cross plate 64, positioned substantially in the center of the longitudinally extending spring leaf 12, bridges the width of the spring leaf 12 and is bolted to the truss column bolt guide member 65 into which the round upper end 66 of the bolt 67 fits. The bolt 67 is formed in its center section 68 as a hexagon-shaped plate to be turned by a fitting wrench and is threaded in its lower section 69 and turned into the inside of the truss cable carrying cap 70 which in turn is at its lower end 71 slotted and shaped to provide a smooth angular transitional support for thr truss cable 53.

The connection between the outer end of the truss cable 53 and the support bracket 15' comprises the short shoulder tube 72, swaged around the end of the cable and resting against the grooved indentation in the substantially upright wall of the support bracket 15'. An insert slot 73 permits positioning of the truss cable 53 with the necessary slack after insertion taken up by adjustment of the truss column height.

In general, a number of varied considerations related to the subject matter of this invention are hereinafter referred to:

Structurally, many known modes of connecting the truss cable 53 to the spring leaf 12 or its carrier, such as by ring-ey, fork, sleeve, hook, sling or socket are applicable to the structure.

While a single torsionally operate spring leaf will for reasons of simplicity be the preferred mode for construction of the banking arm, the use of two or even three single horizontally positioned spring leaves are an acceptable way for combining the leaf package with the truss cable to secure a substantial reduction in bending deformation and will even have an advantage where exceptionally low wheel rates in combination with low stresses in the leaves are desired.

Since the proposed positioning of the truss cable calls for a very moderate bending of the cable only, the selection of a cable of fewer strands, with each strand one solid wire of a larger diameter, and all strands wound up to form, for instance, a ⅜ inch diameter wire rope, would result in a truss cable which could in itself furnish its own rotational resistance, contributing to the rotational leaf spring resistance. It seems feasible to balance such cable resistance by having the cable construction in right-hand wire thread or "lay" on one side and left hand wire thread or "lay" on the other side of the pair of banking arms to secure added plus and minus resistance on the curve outside and curve inside of the vehicle respectively during curve ride.

Comparing banking arm constructions previously disclosed and patented to this inventor as cited above and comprising leaf bundles, a weight reduction of 18 lbs. per resilient support for each arm or 72 lbs. for the banking arm supported vehicle may result from the proposed suspension structure, with additional weight reduction arising from the elimination of the bundel-enclosure anchors themselves.

A lowering of the superstructure will be possible since the new banking arm structure itself is of reduced height in its center section and further reduced height in its end sections.

High frequency vibrations, typical for single spring leaf suspension applications where operated in bending deflection only, are greatly suppressed by the high torsional deflection of the leaf, always present in the working zone-static height as well as plus and minus wheel oscillation- in the banking arm application of this invention.

Vibration control deriving from the polyurethane cushions forming a part of each banking arm will be even more valuable for the proposed simplified arrangement of this invention.

A second triangular cabe might easily be added and positioned upside down above the torsionally opeated leaf spring where the multiturn cushion loading in selected suspension applications recommends added control of the leaf bending deformation, without losing any substantial part of the desired weight reduction of the structure.

Two truss cables, placed side by side, might be preferred as securing a SAFETY factor, especially during the introductory period of the device.

Conditions may arise in the further development of automobile suspensions, where the suggested placing of the torsionally operated spring leaf into a horizontal plane is changed into one of placing it into a vertical plane. The cable truss structure would then have to be placed into the corresponding horizontal plane. However, since bending deformation forces active on the spring leaf, will, with present proposed positioning of the multiturn cushions exert always greater pressures toward downward bending than toward sideward bending of the leaf, the truss arrangement has been designed in the structures illustrated to resist this larger bending deformation force and has therefore been positioned into the vertical plane, with the leaf positioned into the horizontal plane.

Various modes of carrying out the invention are contemplated as being within the scope of the following claims particularly pointing out and distinctly claiming the subject matter which is regarded as the invention.

I claim:

1. In a vehicle of the class described having a superstructure, a banking support for the superstructure connecting the superstructure on its forward end to a wheel spindle carrying wheel supported rigid front axle structure and on its rearward end to a rigid wheel supported rear axle housing structure and comprising a plurality of pairs of cooperating roll banking arms, each arm including a longitudinally extending torsionally resilient support connected by a ball and socket joint at one end to the superstructure and at the other end to the respective rigid axle, a side lever arm protruding from the respective torsionally resilient support and bearing at its end against a resilient multiturn cushion of polyurethane-based material placed near the end of the torsionally resilient support where axle supported and a side lever arm protruding from the respective torsionally resilient support and bearing at its end against a resilient multiturn cushion of polyurethane-based material placed intermediate the length of the torsionally resilient support where superstructure supported, and means including a member strong in tension but flexible in torsion secured to and co-extensive with one side of said support to increase the resistance of said torsionally resilient support against flexing in a vertical direction to control the vertical position of the superstructure relative to the rigid axle structure.

2. The construction of claim 1 in which each said torsionally resilient support comprises the combination of a torsionally operable spring leaf disposed generally in one of said planes, and said last named means comprises a truss cable secured at its ends to the ends of said spring leaf, and a center spacer disposed between said cable and leaf to provide a truss against flexing in the general vertical plane of the cable without substantial interference with torsional twist of said leaf.

3. The construction of claim 2 in which said center spacer is adjustable to regulate the tension of said cable.

4. The construction of claim 2 in which said spring leaf is disposed in a generally horizontal plane and said cable truss lies in a generally vertical plane.

5. The construction of claim 2 in which a cable is provided both above and below the leaf.

6. The construction of claim 2 in which each cable is comprised of a plurality of wire strands wound in a direction to supplement the torsional resistance of the spring leaf in supporting the weight of the vehicle.

* * * * *